United States Patent
Kurtz

Patent Number: 5,754,278
Date of Patent: May 19, 1998

[54] IMAGE TRANSFER ILLUMINATION SYSTEM AND METHOD

[75] Inventor: Andrew F. Kurtz, Rochester, N.Y.

[73] Assignee: Eastman Kodak Company, Rochester, N.Y.

[21] Appl. No.: 753,667

[22] Filed: Nov. 27, 1996

[51] Int. Cl.$^6$ ............................. G03B 27/72
[52] U.S. Cl. .................. 355/67; 359/20; 359/365; 362/268
[58] Field of Search ............................ 355/18.1, 67–71; 362/268, 331, 333; 250/228, 215; 359/15–17, 20, 362, 365, 366, 367; 353/69, 38

[56] References Cited

U.S. PATENT DOCUMENTS

| | | | |
|---|---|---|---|
| 3,988,537 | 10/1976 | Cooley | 355/67 |
| 4,395,108 | 7/1983 | Morse | 355/1 |
| 4,427,283 | 1/1984 | Gasper | 355/1 |
| 4,497,015 | 1/1985 | Konno et al. | 362/268 |
| 4,764,793 | 8/1988 | Goll et al. | 355/38 |
| 4,797,711 | 1/1989 | Sasada et al. | 355/32 |
| 4,868,383 | 9/1989 | Kurtz et al. | 250/228 |
| 4,899,040 | 2/1990 | Davis et al. | 250/216 |
| 4,918,583 | 4/1990 | Kudo et al. | 362/268 |
| 5,012,346 | 4/1991 | DeJager et al. | 358/214 |
| 5,046,793 | 9/1991 | Hockley et al. | 359/12 |
| 5,098,184 | 3/1992 | van den Brandt et al. | 353/102 |
| 5,155,596 | 10/1992 | Kurtz et al. | 358/214 |
| 5,241,459 | 8/1993 | Kaplan et al. | 362/298 |
| 5,365,354 | 11/1994 | Jannson et al. | 359/15 |
| 5,418,583 | 5/1995 | Masumoto | 353/38 |
| 5,502,302 | 3/1996 | Leonard | 250/234 |

FOREIGN PATENT DOCUMENTS

| | | | |
|---|---|---|---|
| 744641 | 11/1996 | European Pat. Off. | 355/67 |
| 95/03935 | 2/1995 | WIPO | |

OTHER PUBLICATIONS

"Optical Scanning System for a CCD Telecine for HDTV" by Andrew F. Kurtz and David Kessler, SPIE. vol. 1448 Camera and Input Scanner Systems (1991), pp. 191–205.

Kinoform Diffusers, by H.J. Canfield, SPIE Proceedings, vol. 25, Developments in Holography, pp. 111–113.

*Primary Examiner*—D. Rutledge
*Attorney, Agent, or Firm*—Raymond L. Owens

[57] ABSTRACT

An illumination system for an image transfer system having a gate at which an original image to be transferred can be positioned, to provide a transfer region of illumination at the gate, comprising:

(a) a light source;

(b) an optical assembly positioned to receive light from the light source and direct and shape the light to form a first region of illumination, the optical assembly including at least one integrator assembly which provides improved spatial uniformity of the light without diffusing the light;

(c) a diffuser in the path of light from the optical assembly to increase optical divergence of the first region of illumination to form the transfer region of illumination.

25 Claims, 4 Drawing Sheets

IMAGE TRANSFER ILLUMINATION SYSTEM AND METHOD

FIELD OF THE INVENTION

The invention relates generally to the field of film transfer, such as film scanning, and in particular to an illumination system suitable for use in a film transfer apparatus or method.

BACKGROUND OF THE INVENTION

State of the art illumination systems for film scanners typically include light-sensitive charge coupled device (CCD) linear arrays. These provide serial outputs representing lines of image information. The scanner further includes a light source for illuminating a linear section of the film being scanned with either a scanning light beam or a line of diffuse light. For color film applications, the film scanner can include a light source that is subjected to dichroic filtration to tailor the spectral content of the light according to the film being scanned. A light integrator transforms a light beam from a light source into a line of diffuse light emitted through an elongated aperture for illumination of the film frame. The line of light must be sufficiently uniform in intensity and diffuseness along its length, and must have the red, green, and blue spectral radiances for the film being scanned. As light passes through the illuminated linear section, it is color and intensity modulated by the image therein, and is imaged by a lens onto three color filtered CCD arrays as described, for example, in commonly assigned U.S. Pat. Nos. 5,012,346 and 5,003,379. The film motion provides the vertical (frame) scan, and the linear synchronized electronic cycling of the CCD array provides the horizontal (line) scan.

In recent designs for illumination systems for film scanners, much use has been made of light integrating means for providing uniform and diffuse illumination. The uniform illumination of the film assists the image transfer process by reducing the extent of the required electronic pattern correction, and preserving the signal to noise ratio. Effectively, all parts of the object are illuminated identically regardless of position. These film scanner designs are typically non-coherent systems, in which the acceptance angle of the imaging lens is appreciably smaller than the diffuse spread of the illuminating light. This diffuse illumination provides so called "scratch suppression" which prevents phase artifacts, such as scratches, from being seen in the transferred image. It compensates for the light lost due to refraction and scattering at a scratch, by providing higher angle incident light, which is then deflected off the scratch and into the acceptance angle of the imaging lens.

Much of the recent art for the design of film scanner illumination systems has used integrating cylinders to provide diffuse and uniform illumination. The integrating cylinder is typically an elongated hollow cavity with side walls consisting a high reflectivity, white, diffusely scattering surface, coated with an appropriate material, such as BaSO$_4$ paint. A system utilizing such a cylinder is described in detail in the article "Optical Scanning Systems for a CCD Telecine for HDTV", by Kurtz et al. in SPIE, Vol. 1448, 1991, pp. 191–205. As described in that article, and in commonly assigned U.S. Pat. Nos. 4,868,383 and 5,155,596, and 5,241,459, the integrating cylinder homogenizes the light thoroughly, providing not only a line of diffuse uniform illumination, but also enabling a very effective feedback mechanism to control temporal noise in the lamp source. This homogenizing of the light is largely a function of there being multiple scattering reflections of the light within a cavity before it exits and illuminates the film. The illumination systems based on the integrating cylinder are very effective, but there are several opportunities for improvement, which will be discussed as follows.

As the integrating cylinder makes use of multiple scattering reflections to homogenize the light, even with a high reflectivity interior surface, light loss accumulates with each reflection. This overall loss can be significant, particularly when compared to an idealized "single pass" system, in which the integration is accomplished with relatively few surfaces. Furthermore, integrating cylinders intrinsically provide Lambertian diffuse illumination, wherein the light is diffused out over a full ±90° hemisphere. However, even for scratch suppression, light diffused out beyond approximately 50° is essentially wasted, as the light beyond 50° provides only a marginal gain in the quality of the scratch suppression for the light lost. Furthermore, such high angle light can contribute to increased flare in the imaging portion of the film scanner, particularly from light scattering from the interior surfaces of the imaging lens assembly or the detector assembly. Finally, the integrating cylinder, to be used most effectively, is inherently located in very close proximity to the film plane. The cylinder is then competing for space with the other elements of the film gate mechanism, such as the aperture plate and film positioning guides that are also present.

Thus it would be desirable to have a "single pass" light integration system for a film scanner that provided high efficiency, allowed control of the angular diffuseness of the illuminating radiation, and did not substantially suffer from space conflicts with the design of the film gate.

SUMMARY OF THE INVENTION

The present invention realizes that light integrating means, such as fly's eye integrators or light tunnel integrators (sometimes referenced as "kaleidoscope" integrators) can be employed to conveniently provide good uniform illumination. However, the present invention further recognizes that light from such integrators does not have the required diffuseness characteristics, as discussed above, for applications such as film scanning. The present invention corrects for this by using a suitable diffuser such as a holographic light shaping diffusing elements, with either a symmetrical or anamorphic diffusing response. Holographic diffusers allow control over the angular extent, shape and direction of the exiting light, without introducing color differences when used with white light. The present invention further recognizes that with holographic diffusers, when light diffusion with an off axis angular bias to the outgoing light is used, small amounts of dispersion or color fringing can be introduced. This is eliminated or reduced in the present invention by using such diffusers primarily to tailor the illumination angularly, and only secondarily to assist in providing illumination uniformity (illumination uniformity being primarily obtained from the foregoing light integrating means). Other lensing elements may be employed to shape the light appropriately for providing either an illumination region of a desired shape, such as an area or linear illumination.

In one aspect, the present invention then provides an illumination system for a film transfer system which has a gate at which an original image can be positioned. The illumination system provides a transfer region of illumination at the gate, and comprises:

(a) a light source;

(b) an optical assembly positioned to receive light from the light source and direct and shape the light to form a first region of illumination, the optical assembly including at least one integrator assembly which provides improved spatial uniformity of the light without diffusing the light;

(c) a diffuser in the path of light from the optical assembly to increase optical divergence of the first region of illumination to form the transfer region of illumination.

The illumination system may have use in any image transfer system, particularly a printer or a scanner.

In one aspect of the invention the illumination system is adapted for use in a scanner having a linear detector and a gate (such as a film gate) at which a media (such as a transparent film) to be scanned is placed. In this case, the illumination system comprises:

(a) a light source;

(b) an optical assembly positioned to receive light from the light source and direct and shape the light to form a first line of illumination which is anamorphically divergent, the optical assembly including at least one integrator assembly which provides improved spatial uniformity of the light without diffusing the light;

(c) a diffuser in the path of light from the optical assembly to increase optical divergence of the first line of illumination to form the scanning line of illumination.

The present invention further provides a printer and a scanner incorporating an illumination system as described above, as well as a method of printing or scanning an image using such an illumination system. The method comprises:

(a) positioning a media to be transferred at the gate;

(b) directing light from the light source through the optical assembly to form the first region of illumination; (c) directing light from the optical assembly through the diffuser to form the transfer region of illumination on the media; and (d) directing light from the media onto the detector (which in the case of the scanner, generates the sequence of electrical signals corresponding to an illuminated region of the image on the media).

An illumination system of the present invention can provide "single pass" light integration with high efficiency, and ready control of the angular diffuseness of the illuminating radiation by altering the characteristics of the required diffuser. Further, the illumination assembly can be relatively compact so as not to substantially suffer from space conflicts with the design of the film gate. Additionally, color fringing resulting from light diffusion in a holographic diffuser with an off axis angular bias to the outgoing light, can be reduced.

BRIEF DESCRIPTION OF THE DRAWINGS

Embodiments of the invention will now be described with reference to the drawings, in which.

To facilitate understanding, identical reference numerals have been used, where possible, to designate identical elements that are common to the figures.

DETAILED DESCRIPTION OF THE INVENTION

In the present invention, it will be understood that by a "fly's eye lens" is referenced an array of lenslets of any suitable shape. For example, the array may be a one or two-dimensional array of lenslets (that is, the pattern of lenslets extends in one or two directions). An example of a one-dimensional array is a lenticular lens sheet having on one face a plurality of adjacent elongated cylindrical lens surfaces. An example of a two-dimensional array is an array of small spherical lenslets extending in a pattern in both of two dimensions, such as disclosed in U.S. Pat. No. 4,497, 015, although the lenslets can be of other transverse cross-section shape (for example, circular) than quadrangular as described in that patent. Furthermore, it will be appreciated that two-dimensional arrays can be formed by crossing two one-dimensional arrays, such as taught in U.S. Pat. No. 3,667,832 (where each one-dimensional array is a lenticular gradient index plate).

While various light integrators meeting the above requirements, such as a light tunnel, can be used in the present invention, it is preferred to use a light integrator which includes a fly's eye integrator assembly. Furthermore, the diffuser will typically be an anamorphic diffuser particularly where the illumination region is not symmetrical. For example, where the fly's eye integrator and/or other elements of the optical assembly, are also anamorphic, so as to produce a scanning line of illumination.

Figure 1:
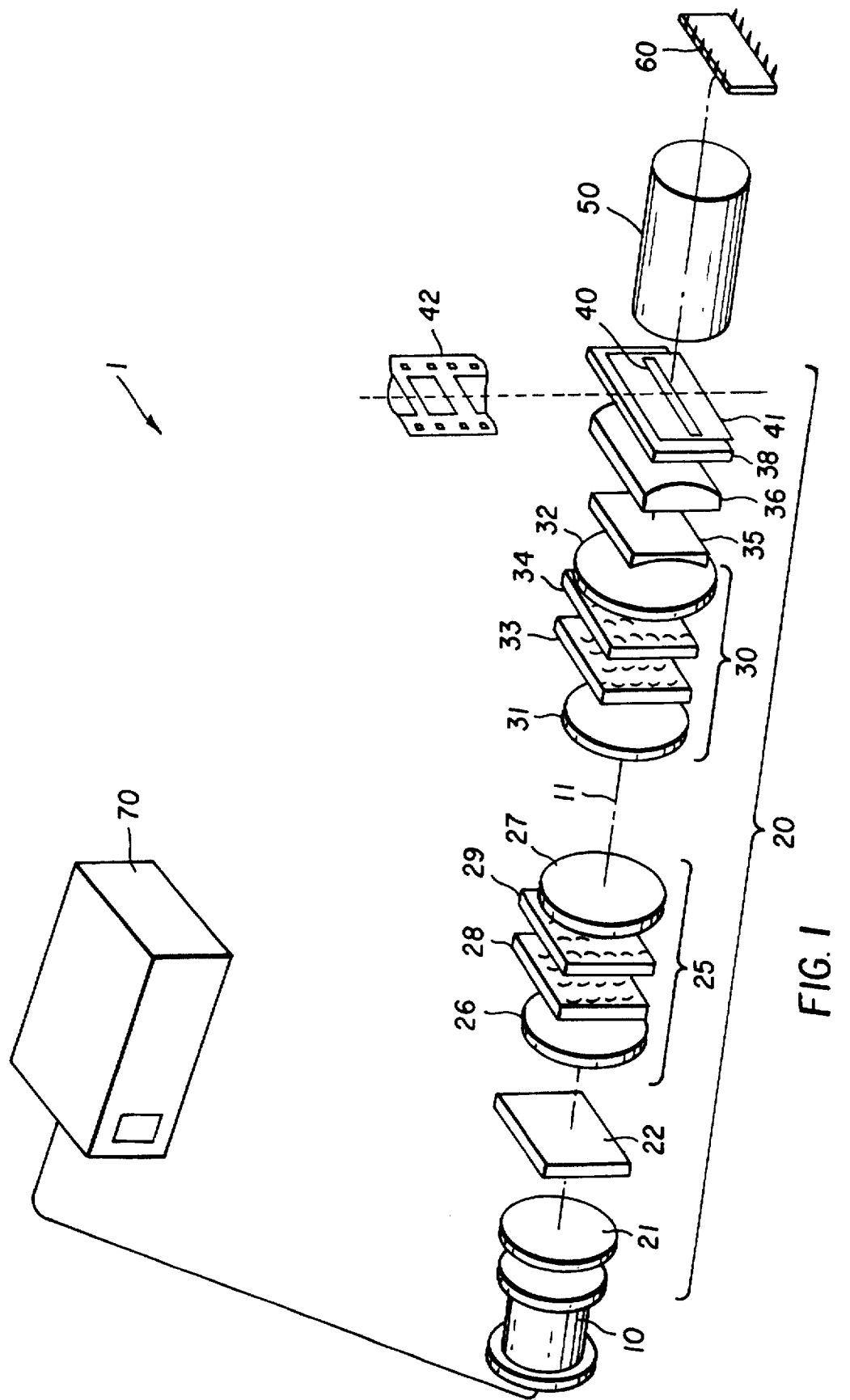
FIG. 1 is a perspective view of a film scanner according to the present invention.

The preferred embodiment of the present invention for a film transfer system is shown in the context of a full illumination and imaging system, shown in general by numeral 1 in FIG. 1. The system of FIG. 1 is particularly configured to be a film scanner, and as such generally includes a light source 10, illumination optics 20, a film gate 40, an imaging lens 50, and a sensor 60 (sometimes referenced as a "detector"). Sensor 60 is positioned to receive light from a film positioned in gate 40 for scanning, and to generate a sequence of signals corresponding to an illuminated region of an image on the media. The foregoing signals are then typically converted to a digital output corresponding to each line of the image, and processed and/or stored in a known manner.

For systems for transferring color films, light source 10 is a white light lamp, such as a tungsten halogen lamp, a metal halide arc lamp, or a xenon arc lamp. In particular, for this discussion, light source 10 is a compact short arc xenon arc lamp, such as a LX-300f lamp, available from ILC Technology of Sunnyvale Calif. The light emitted by this lamp is very non-uniform, as it is generally gaussian in profile, with darkened areas as well, from the shadows cast into the beam by the electrode support structure. A light beam 11 from the light source is controlled by field lens 21, and directed through spectral filters 22 and other components such as a filter wheel and a shutter (not shown). The light is then further modified by a first stage integrator assembly 25, which consists of field lenses 26 and 27, as well as uniformizer lenslet arrays 28 and 29. Light of improved uniformity is then input into a second stage integrator assembly 30, which consists of field lenses 31 and 32, as well as uniformizer lenslet arrays 33 and 34. The light beam 11, with further improved uniformity, is directed to the film gate 40, by means of field lens 32 and cylindrical lens elements 35 and 36, which together modify the light into an elongated area of illumination incident at the illuminating diffuser 38. This diffuser further modifies the light, primarily to adjust the angular light diffusion in a controlled fashion, so as to illuminate the film with an optimal scratch suppression light distribution. The diffuser 38 also provides further improvement to the spatial uniformity, as the light passes through the aperture plate 41 and on to the film. Aperture plate 41 defines the area to be illuminated on the film 42. The illuminated area on the film now defines an object, which, in turn, is imaged onto a CCD sensor 60 by an imaging lens 50. The acceptance angle or numerical aperture (NA) of the imaging lens at the film gate is appreciably smaller than the angular extent of the diffuse illumination supplied to the film.

As noted previously, the illumination systems employed in film scanners and printers have typically included light integration means such as an integrating cylinder (for example U.S. Pat. No. 4,868,383 and U.S. Pat. No. 5,155, 696), a light integrating box (U.S. Pat. No. 4,764,793), or an integrating bar (U.S. Pat. No. 4,395,108). In these systems, there is typically very little control over the angular extent or profile of the diffused light, and the illumination tends to become lambertian, with light distributed out to a full ±90°. U.S. Pat. No. 4,427,283 discloses one method, used in a photographic printer, for adapting an illumination system with an integrating bar, with a condenser lens, so as to limit the angular spread to between ±35° and ±65°. In general, these systems won't however provide illumination uniformity with only a few percent residual variation together with diffuse illumination with a controlled angular spread.

Additionally, most of these integration techniques significantly reduce the brightness of the light conducted through the entire optical system. By comparison, the optical systems designed for photolithographic printing, such as in the manufacture of semiconductors make use of integrators such as fly's eye systems and light tunnels, which substantially preserve the brightness while providing uniform illumination. In these systems, utilizing either an arc lamp source, such as a mercury arc lamp, or an excimer laser, an illuminated mask is imaged to the work plane to print the mask pattern in photoresist. Typically, the resulting illumination of the mask is fairly specular, as well as spatially uniform, with the incident radiation varying by only a few percent. Fly's integrators have also been used in projection systems and laser machining systems, where the provided illumination is again both specular and uniform. U.S. Pat. No. 5,098,184 and 5,418,583 describe such systems. Both fly's eye and light tunnel integrators can be adapted for use in a film scanner illumination system, to provide the improved light uniformity without diffusing the light, while other means, namely the cylindrical condenser lenses and the illuminating diffuser, provide the means for tailoring the diffuseness of the illumination to be appropriate for scratch suppression.

The system of FIG. 1 employs a classical fly's eye integrator systems, with two homogenizing stages of lenslet arrays, as shown by the integrator assemblies 25 and 30. Field lens 21 creates a secondary source, the image of the lamp arc, as input into the first integrator 25. The fly's eye integrator 25 includes a plurality of lenslets (those of the first lenslet array 28), arranged parallel to the optical axis/light beam 11, for subsampling the intermediate illumination plane (the secondary source) at the a1 plane. These lenslets (of the first uniformizer lenslet array 28) form a plurality of images of the lamp exit face (plane $b_o$) onto a first focal plane. The fly's eye integrator 25 then includes a second plurality of lenslets (second uniformizer lenslet array 29) located in the vicinity of this first focal plane, and corresponding respectively to the first plurality of lenslets, which in turn help to create images of the first plurality of lenslets at a second focal plane. Field lens (27) works with the second uniformizer lenslet array (29) to create this plurality of images at the second focal plane, both magnified and overlapped onto each other in a centered fashion. The fly's eye assembly (25) may also include an input field lens (26) to alter the input light to be telecentric into the assembly.

The light incident to the second integrator assembly (30) has an irradiance distribution which is considerably improved for spatial uniformity. The uniformity is however further improved by the second stage integrator assembly, shown as a fly's eye system 30, which works similarly to the first, by breaking the incident light up into further beams, which are magnified and imaged together in overlapping fashion. To adapt the light properly for use in a film scanner with a linear CCD array, an anamorphic lensing system is used after the second integrator assembly 30, to create a long narrow line of illumination incident into the film gate. In FIG. 1, such an anamorphic system is illustrated by lens elements 32, 35, and 36. In the line scan direction, the illuminated area generally covers nearly the full width of the film frame. In the film scan direction, the illuminated area is dependent on the film scan height of the pixel sites on the CCD sensor, plus some allowance for illumination roll-off and system tolerances. For example, in a system configured to scan 35 mm film, the illuminated width in the line scan direction might be 25.0 mm, as compared to 3.2 mm illuminated height in the film scan direction. The light entering the film gate is then further modified by the illuminating diffuser 38 and the aperture plate 41, before it is incident onto the film 42.

As the illumination optical system 20 provides the film with a long narrow line of illumination by means of conventional lens elements, the light incident to the film gate is converging much more rapidly in the film scan direction, than it is in the line scan direction, where it is relatively specular. For example, the system could readily provide a line scan NA of 0.7 (45°) as compared to a film scan NA of 0.11 (±6.3°). Thus, the further modification of the illumination is necessary, before it conforms to a more optimal distribution for scratch suppression, such as ±55° (NA of 0.82) divergence in both the line scan and page scan directions.

To achieve such tailoring of the illumination, the appropriate diffuser must be anamorphic, with greater diffusion in the film scan direction than in the line scan direction. Anamorphic diffusion is generally beyond the capability of conventional diffuser technologies, such as ground glass and opal glass diffusers. However, a new class of diffusers, holographic light shaping diffusers, have this capability, as well as several other significant advantages. In particular, holographic diffusers can diffuse the light over a limited angular extent, and provide elliptical (anamorphic), as well as circular, diffusion. Diffusers can also be constructed where the angular directionality of the diffused light is controlled. Finally, these diffusers are not only very efficient, diffusing the light with very little backscatter, but they also work well with white light, diffusing the light without introducing color fringing. Such holographic diffusers, which are surface, rather volume diffusing devices, are available from Physical Optics Inc. of Torrance Calif., or from Kaiser Optical Systems of Ann Arbor Mich. Principal features of surface holographic diffusers are described in "Kinoform Diffusers", by H. J. Caulfield, *SPIE Proceedings*, Vol. 25 pages 111–113 (April, 1971).

The illuminating diffuser 38 of FIG. 1 tailors the light incident to the film gate 40 to make it more optimal for film illumination with scratch suppression. As the illumination optics 20 do provide an anamorphic input, the illuminating diffuser 38 would generally also be anamorphic, for example providing ±10° diffusion in the film scan direction, and ±50° degrees in the line scan direction, to arrive at a resulting illumination that is approximately ±55° in both orientations. In general, the diffusion response profiles of the holographic diffusers presently commercially available are roughly gaussian in profile. The angular limits to the diffusion given above roughly correspond to the $1/e^2$ points of these diffusion profiles.

An aperture plate 41 is positioned between the illuminating diffuser 38 and the film 42. The aperture determines the actual area of the film to be illuminated. For example, it prevents light from hitting the perforations, as otherwise leakage through the perforations could cause excessive flare in the system. Generally, the film 42 also rides on the surface of the aperture plate, with proper positional registration. The aperture plate also positions the film a small distance from the surface of the illuminating diffuser 38. In particular, the illuminating diffuser must be positioned away from the film by an axial distance which is greater than the depth of focus of the imaging lens 50. Otherwise, it would be possible to image the diffuser, which has a mottled surface structure, to the sensor 60, and cause artifacts in the images. Furthermore, the spatial uniformity of the illumination is further enhanced by the diffusing overlap of the light over this distance. Finally, this offset distance holds the film 42 out of contact with the diffuser 38, thereby preventing damage to either item.

The film transfer system 1 is intended to reproduce the image information, which is typically recorded as amplitude information (dye densities) on the film, without recording the phase structure (such as scratches and film matte). One method to accomplish this, as described by the theory for partially coherent imaging systems, is to have the system image light of a lesser NA than is provided for by the illumination. In FIG. 1, the imaging lens 50, has an acceptance NA which is much smaller than the illumination NA. For example, a typical imaging lens NA at the film is 0.1, as compared to an illumination NA of 0.7 or greater. Ordinarily, only light within the narrow NA accepted by the imaging lens makes it through the lens to the sensor. The higher angle light is only imaged by the lens if it is deflected into the lens by a scratch or other phase artifact, such as film matte. Thus, diffuse illumination compensates for the specular light which was deflected out of the imaging system by the scratches and other phase artifacts. While 50°–55° of diffuse illumination at the film gate may be optimal for critical applications, lesser amounts of diffuse illumination, such as 20°–35° (for example 25, may be acceptable for less demanding systems.

Figure 2:
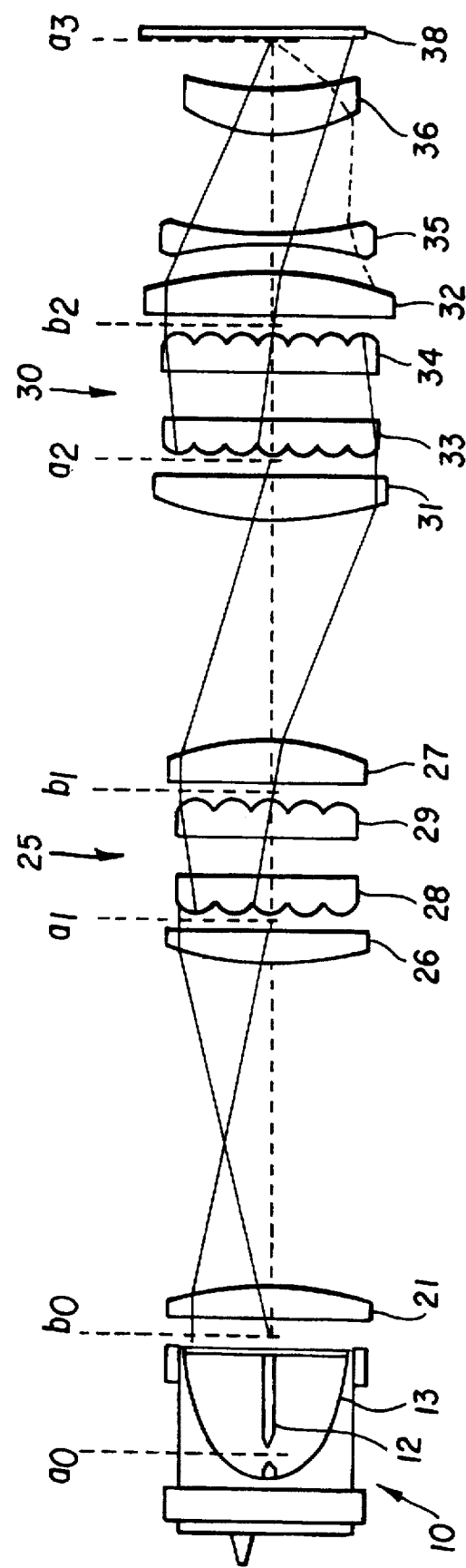
FIG. 2 is a side view of the invention shown in FIG. 1, showing additional details of the optics arrangement, and particularly the illumination optics prior to the film gate.

The film transfer system of FIG. 1 will now be discussed in greater detail, with regards to specific representative configurations of the illumination optics 20. In FIG. 2, an embodiment is illustrated where two stages of fly's eye integrator assemblies 25 and 30 are used together, and the emission area (plasma "ball") of the lamp source 10 is conjugate to the film gate 40. The lamp 10 is a complex structure, with an emission volume in the area of plane $a_o$, that has a substantially non-uniform light profile, which might for example be generally gaussian in nature. As the light exits the lamp, it passes through a plane, shown as $b_o$, which in many sources is effectively a Koehler plane, where the light profile is typically more uniform. Generally, the improved uniformity is the result of overlap of light from the many source points that emit light. However, in the case shown in FIG. 2, the light source 10 has an electrode 12 and electrode support structure which interferes with this effect, obstructs light, and casts shadows into the beam. Thus, either the emitting area at $a_o$ or the exit face at plane $b_o$ can be used as the effective source for the design of the optical system, but in either case, the initial light profile is substantially non-uniform, and improvement is required.

In the system of FIG. 2, planes $a_o$, $a_1$, $a_2$, and $a_3$ share conjugacy. Field lens 21 works in combination with a concave reflector 13 to image the emission area to the first stage integrator assembly 25 at an intermediate illumination plane $a_1$. The fly's eye integrator assembly 25 is fashioned after those in traditional photolithographic systems, such as that of Konno (U.S. Pat. No. 4,497,015), in that two lenslet arrays are used to break the beam from the lamp source into many smaller beams, and overlap these many beams, thereby improving spatial and angular uniformity. Field lens 26 is used to introduce the light to the first lenslet array 28 in a telecentric fashion. The front surface of lenslet array 28 is located at or near the $a_1$ image plane, and lenslet array 28 consists of N1 elements, where N1 is the number of lenslets in a given meridian. Lenslet array 29 also has N1 elements, which are aligned with those of lenslet 28. Lenslet arrays 28 and 29 consist of elements of identical focal lengths, and these two arrays are located a focal length apart from each other. (Actually, the distance from the principal plane of the first lenslet to the principal plane of the corresponding second lenslet is nominally one focal length apart.) Thus, each lenslet array 28 images the effective source at the $b_o$ plane into the aperture of the corresponding lenslet of array 29. Each of these N1 images are incomplete, because each contains only a sample of the angular light content of the $b_o$ effective source. Each lenslet of array 29, works with field lens 27 to image and magnify the corresponding lenslet of array 28 to the $a_2$ plane. Field lens 27 also causes all of these N1 images to be superimposed at this second $a_2$ intermediate illumination plane. In effect, the lenslet pairs within an integrator assembly work to map one aperture to another, pupil to stop, stop to pupil.

The light at the $a_2$ plane will have an improved uniformity profile, but as film transfer systems can require only a few percent residual nonuniformity, a second fly's eye integrator stage 30 is likely needed. Also, the light homogenization is typically incomplete after one stage, in that all points within the illuminated area may not see light from all points of the source, or all points within the area may not see the full angular range of incident light.

As shown in FIG. 2, integrator assembly 30 works in a similar fashion to integrator assembly 25. Field lens 31 alters the incident light to be telecentrically input to lenslet array 34. The light at the $a_2$ plane is broken into N2 portions, where N2 is the number of lenslets along a meridian in each of the uniformizer lenslet arrays 33 and 34. The corresponding lenslet elements in the second array 34 work together with field lens 32 to image the lenslets of array 33 in a magnified and overlapping fashion onto the $a_3$ plane, and into the film gate 40. Various ray paths are shown in FIG. 2 to illustrate the imaging methodology.

There are several ways in which the illumination optics 20 can be configured. For example, in FIG. 2, the field lens 21, and integrator assemblies 25 and 30 can function in both the line scan and page scan meridians. That is the lens elements 21, 26, 27, 31 and 32 would be axially symmetrical elements (circular), and the lens arrays 28, 29, 33, and 34 would be two dimensional arrays, as is shown in FIG. 1. Each lenslet array 28, 29, consists of a total of N1×N1 square lenslets, while arrays 33 and 34 both consist of N2×N2 square lenslets. In this case, cylindrical elements, such as lenses 35 and 36, are inserted in the system after the second stage integrator, to focus the light more quickly to a smaller width in the film scan (or cross array) direction. The film scan direction system, comprising elements 32, 35, and 36 is a three element reverse telephoto system, where the system length is longer than the system focal length. Indeed, the overall length of this system is equivalent to the focal length of the line scan direction focusing lens (32).

In an example of a design for an illumination optical system following that of FIG. 2, a LX-300f short arc lamp source, from ILC Technology, with an exit window of 25 mm diameter was used. The field lens 21 has a focal length of 100 mm and generates an image of the arc plasma at plane $a_1$ that is 24.4 mm wide. Field Lens 26 also has a 100 mm focal length. The two lenslet arrays 28 and 29 of the first stage integrator 25 consist of N1=9 elements, where each element has a focal length of 5.42 mm, and a full width of 1.36 mm. Field Lens 27 has a focal length of 72 mm, so that the lenslets of array 28 are magnified 13.3×, to flood illuminate the $a_2$ intermediate image with light over an area 18 mm wide. Field Lens 31 also has a 72 mm focal length. The two lenslet arrays 33 and 34 of the first stage integrator 30 consist of N2=13 elements, where each element has a focal length of 4.1 mm, and a full width of 1.39 mm. Field Lens 32 provides for the illumination in the line scan direction, with a focal length of 75 mm, so that the lenslets of array 33 are magnified 18.3×, to flood illuminate the $a_3$ intermediate image with light over an area 25 mm wide. For the film scan direction, the three element reverse telephoto system has an effective focal length of 11.2 mm, so that the lenslets of array 33 are magnified 2.75×, to flood illuminate the $a_3$ image with light over an area only 3.8 mm wide. The illuminating diffuser 38 is nominally an elliptical diffuser, with approximately 7° of diffusion in the film scan direction, and approximately 55° diffusion in the line scan direction. The open aperture of plate 41 is 3.2 mm wide and 24.8 mm long for scanning Super 35 mm format film. The aperture plate will separate the film and the illuminating diffuser by a nominal distance of approximately 1 mm. The overall length of this system 20, from the lamp to the film gate, is approximately 260 mm.

It is to be understood that this system is described in terms of the principal functions of the various components, and that variations are possible which might alter or improve the performance, which fall within the spirit and scope of the invention. For example, the uniformizer lenslet arrays 28, 29, 33, and 34 are depicted as 2D plano convex refractive elements in FIG. 1, but they might be diffractive, have aspherical lensing profiles, or power on both surfaces. The uniformizer lenslet array pairs 28 and 29, 33 and 34, can be constructed as shown as separate elements, or as solid optical elements, with power surfaces on both sides of one piece. In the latter case, greater care must be taken concerning alignment during the component fabrication process. The lenslets of the uniformizer lenslet arrays can also be constructed to eliminate the field lenses. For example, field lens 26 can be removed by adding its function to the design of lenslet array 28. This can be accomplished by constructing the lenslets of array 29 as off axis arcuate sections, so that light incident from the center of plane $b_o$ is redirected onto axes within the lenslets that are parallel to the general system optical axis of the illumination system 20. In this case, the lenslets also work at finite conjugates, and the distance between the lenslet arrays, such as arrays 28 and 29, is no longer one focal length, but the appropriate (and larger) distance required for proper imaging. Thus the lenslets vary across the array, where a lenslet co-linear to the system optical axis has no arc shape shift, and with progressively greater amounts of arcuate shifts relative to the system axis, for lenslets further and further from the system axis. This design approach can be extended to the other uniformizer lenslets, to reduce the overall component count. However, the uniformizer lenslet arrays are more complex and costly components as a result.

Figure 3:
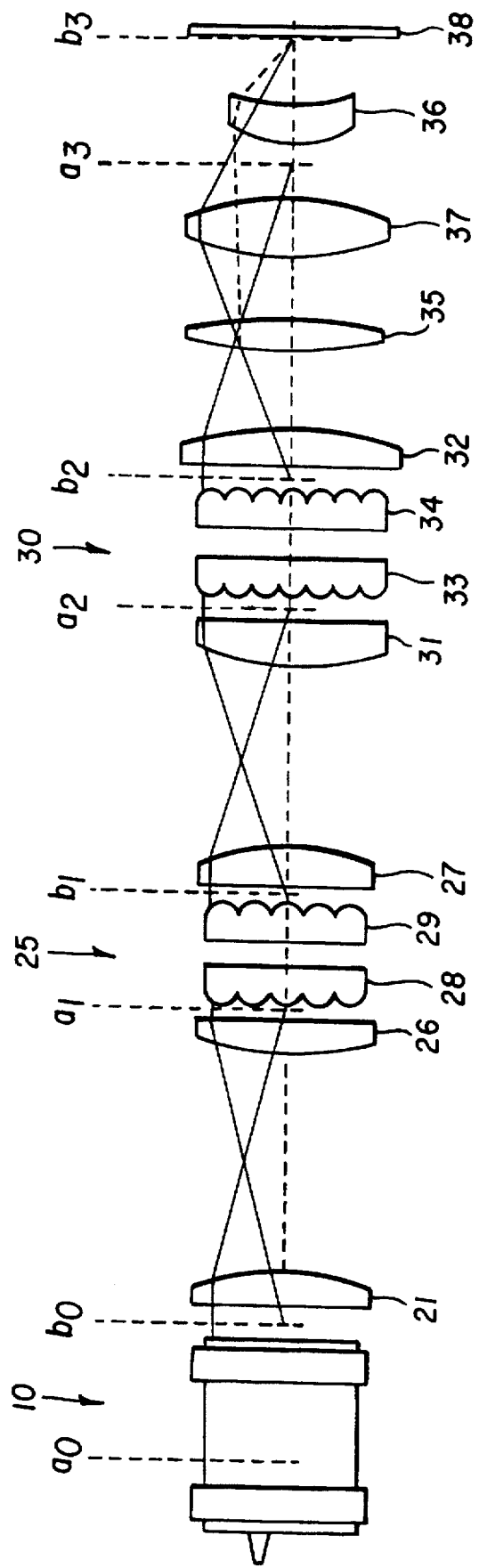
FIG. 3 is a side view of an alternative embodiment of the invention, showing an illumination optics arrangement prior to the film gate.

FIG. 3 illustrates yet another way to configure the illumination optical system 20. The system of FIG. 3 is functionally identical to that of FIG. 2, except that the lensing elements after the second uniformizer lenslet array 33 of integrator assembly 30 are changed so that the illumination plane of the film gate 40 shares conjugacy with the exit face of the lamp source and the exit face of the second integrator assembly. Labels $b_0$, $b_1$, $b_2$, and $b_3$ highlight this conjugacy relationship. To accomplish this, line scan cylinder lens 37, working at finite conjugates, images the entire lenslet array 33 to the film gate. Meanwhile, cylinder lenses 35 and 36 accomplish a similar task for the film scan direction, but at a greatly different magnification.

Figure 4:
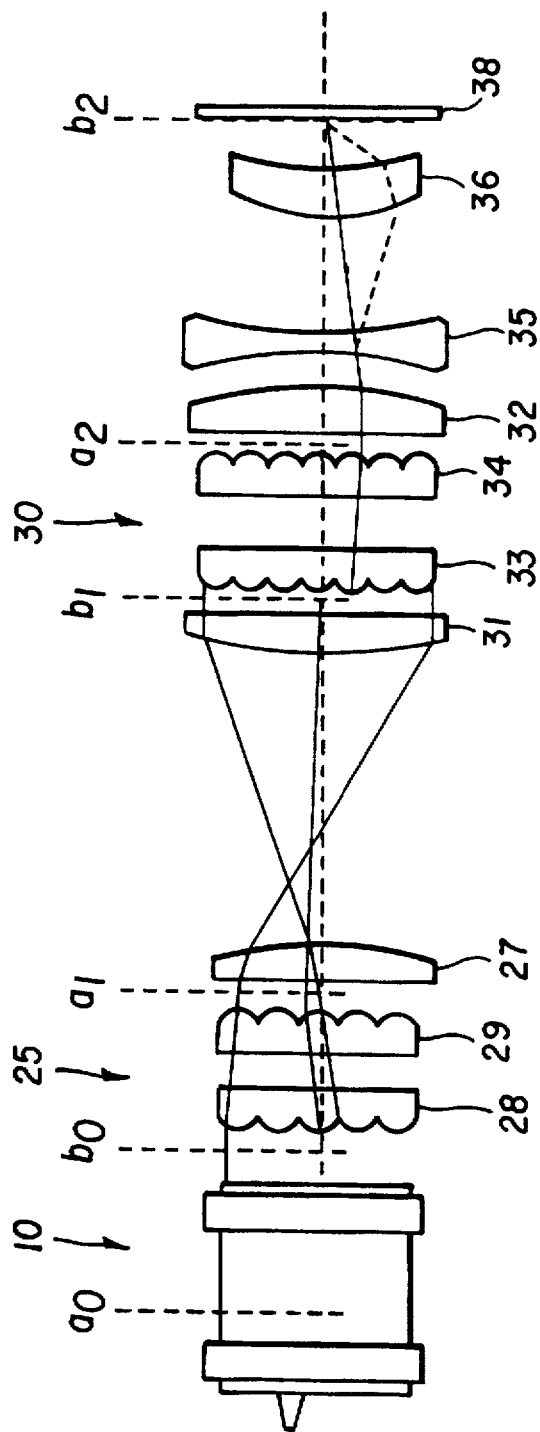
FIG. 4 is a side view of a second alternate embodiment of the invention, showing an illumination optics arrangement prior to the film gate.

FIG. 4 illustrates a third general configuration for the illumination optical system 20. As compared to the prior systems, in the system of FIG. 4 the first two field lenses have been eliminated, and the integrator assembly 25 is in close proximity to the lamp. This system is particularly similar to that of FIG. 2, as the lenses after the uniformizer lenslet array 34 work in combination with the lenslets of array 34 to image the lenslets of array 33 in overlapping fashion to the film gate. Thus, as highlighted by labels $b_0$, $b_1$, and $b_2$, the exit face of the lamp and the film gate share conjugacy. This system could also be patterned after the FIG. 3 system, to instead have the lenses after array 34 image the exit face of array 34 (plane $a_2$) to the film gate. The primary benefits of the FIG. 4 family of systems, with the first uniformizer in proximity to the lamp, are a reduced component count and a potentially shorter system. Thus, as illustrated by FIG. 3 and 4, and then further discussed, there are numerous ways to configure both the integrator stages, as well as the anamorphic optics, and still achieve uniform line illumination onto the illuminating diffuser.

Classically, systems like those of FIGS. 2 and 4 are generally critical illumination systems, as the lamp source is conjugate to the film plane. Likewise, the system of FIG. 3 is generally a Koehler system, as the Koehler plane of the lamp source is conjugate to the film plane. Typically, Koehler illumination systems are superior to critical illumination systems, as a more uniform sampling of the source is used. In this system, when utilizing an arc lamp, which has structure protruding forward, the Koehler plane may actually be less uniform. Thus, the critical systems may be somewhat superior to the Koehler systems. However, with the high degree of homogenization supplied by these systems, the differences may be very small, and this classical terminology to describe illumination systems is less relevant. For other lamp sources, such as halogen bulbs, without such obstructions, the classical reasoning may have more merit in making system design choices.

When the film transfer system 1 is configured as shown in FIG. 1 as a film scanner employing one or more linear CCD arrays, the illumination system 20 is inherently anamorphic, assuming that light efficiency is a priority. All of the illustrations, FIGS. 1–4, utilize anamorphic optics after the homogenizers, and just prior to the film gate. In these cases, the uniformizers 25 and 30 are 2D structures, and homogenize the light (both radiance and irradiance) in both the line scan (array) and film scan (cross array) directions. It is of course possible to position the anamorphic film scan optics earlier in the system. For example the system could be anamorphic after the first stage integrator, in which case the second stage integrator assembly 30 would be anamorphic, and likely consist of cylindrical elements working in the line scan direction, but not in the film scan direction. Alternately, the system could be anamorphic from the outset, with the film scan direction optics imaging the lamp directly to the film gate, and the line scan direction optics consisting of two anamorphic integrator stages with cylindrical elements. These configurations would be generally advantageous because it is easier to manufacture cylindrical lenslet array structures, as compared to 2D lenslet array structures. Also, while the light uniformity at the film gate in the line scan direction is usually critical, in the film scan direction, it is much less so. Effectively, the film scan light profile need be uniform only over the width of the individual pixels, or for example a 20 μm width. Even if sensor 60 actually is a trilinear sensor, with three parallel rows of pixels, uniformity need only be maintained over a width roughly equivalent to the distance between the two extreme rows. This distance might typically be 400 μm, which is still small as compared to the 3–4 mm illuminated width of the film. Finally, as the aperture plate 41 obstructs some of the incident light, the more uniform the illumination profile in the film scan direction, the less efficient the system can be.

In the various configurations of the illumination optical system 20 shown in FIGS. 1–4, two fly's eye integrator lenslet assemblies and the illuminating diffuser are used in a cooperative fashion to improve the illumination uniformity. In particular, the intent is that the illumination at the film gate should be highly uniform both in terms of the radiance and irradiance profiles. If necessary, the uniformity can be further improved by increasing the number of lenslets N1 or N2 in the arrays of the fly's eye assemblies. The finer sampling will improve the uniformity, but also require smaller lenslets in the arrays, which could increase manufacturing cost. Similarly, the uniformity can be improved by adding yet further integration stages beyond the two shown. On the other hand, it might also be that the combination of one fly's eye lenslet array assembly and the illuminating diffuser will provide adequate uniformity, and the second stage integrator assemblies shown in FIG. 1–4 can be eliminated. Furthermore, one of the fly's eye integrator stages can also be effectively replaced by a light tunnel or kaleidoscope integrator, in a similar fashion to the systems shown in Kudo et al. (U.S. Pat. No. 4,918,583).

It is also to be understood that the film transfer system 1 can be configured in other useful ways. For example, if the film scan direction cylinders lenses 35 and 36 of FIGS. 1 and 2 are removed, the system will then uniformly illuminate a nominally square area. The aperture plate 41 can then be altered so as to define a generally square area of the film frame to be illuminated. Alternately, other lenslet shapes, such as rectangular or hexagonal could be used to illuminate an area at the film gate of the corresponding shape. In these cases, the illuminating diffuser 38 would also be changed to be generally more symmetrical or circular in its diffusion response. Some asymmetry in the response may be retained, if the phase artifacts, such as scratches, have a predominate tendency to be oriented in a given direction. For example, cinch marks on motion picture film, are predominately found in the direction of film motion. Then, by altering the sensor 60 to be an area device, rather than the linear device depicted in FIG. 1, the film transfer system has been transformed into an area film scanner. In like fashion, the sensor 60 could also be replaced with photographic paper or other media, which could be fed to the image plane by a sheet feeder or drum mechanism. The system of FIG. 1 has then been transformed into a photographic printer.

The most demanding film transfer systems, such as a telecine, often require active systems within the illumination system to modify the illumination on a dynamic basis. For example, in U.S. Pat. No. 4,868,383, a feedback system is discussed which very effectively reduces the temporal noise variation in the illumination level, because the light sample collected for feedback is highly homogenized spatially within the integrating cylinder. In the system of FIG. 2, a beamsplitter could be placed after the second integrator assembly 30 to redirect a small portion of the light for this purpose. Alternately, a small probe, such as a fiber optic bundle or a small sensor could be placed within the film gate structure 40, to sample some of the light which is rejected by the aperture plate 41. As another example of an active subsystem, in U.S. Pat. Nos. 5,155,596 and 5,528,288, light modulating aperture mechanisms are described, which also work well in a film scanner illumination system with an integrating cylinder. Variable apertures mechanisms typically comprise an opaque blade structure, or a neutral density filter wheel. In the system of FIG. 2, an opaque blade aperturing devices could be placed effectively at the $b_1$ plane, where the modulation would largely effect the light level at the film gate, with little impact on the spatial uniformity or angular uniformity and diffuseness at the film gate. Furthermore, with some lamp sources, and in particular, with xenon short arc lamps, the temporal signature of the light varies spatially within the beam due to the effects of arc wander and gas turbulence within the lamp. Thus, it can be important to place the aperture mechanism in a location where the light from all areas of the light source is distributed equally, so that the spatially dependent noise from the various areas is effected equally. In the case of the system of FIG. 2, such an aperture mechanism could be placed intermediate (and preferably midway) between the first and second stage integrator assemblies 25 and 30, where the light level can be modulated not only without changing the spatial uniformity and diffuseness of the light at the film gate, but also without changing the spatial nature of the temporal noise in the light beam.

The invention has been described with reference to a preferred embodiment. However, it will be appreciated that variations and modifications can be effected by a person of ordinary skill in the art without departing from the scope of the invention.

Parts list 10 light source
11 light beam
12 electrode
13 reflector
20 illumination optics
21 field lens
22 filters
25 integrator assembly
26 field lens
27 field lens
28 uniformizer lenslet array
29 uniformizer lenslet array
30 integrator assembly
31 field lens
32 field lens
33 uniformizer lenslet array
34 uniformizer lenslet array
35 cylinder lens 36 cylinder lens
37 line scan cylinder lens
38 diffuser
40 film gate
41 aperture plate
42 film
50 imaging lens
60 sensor
70 power supply

I claim:

1. An illumination system for an image transfer system having a gate at which an original image to be transferred can be positioned, to provide a transfer region of illumination at the gate, comprising:
  (a) a light source;
  (b) an optical assembly positioned to receive light from the light source and direct and shape the light to form a first region of illumination, the optical assembly including at least one integrator assembly which provides improved spatial uniformity of the light without diffusing the light;
  (c) a diffuser in the path of light from the optical assembly to increase optical divergence of the first region of illumination to form the transfer region of illumination.

2. An illumination system according to claim 1 wherein the diffuser is an anamorphic diffuser.

3. An illumination system according to claim 1 wherein the transfer region of illumination provided is a two-dimensional area.

4. An illumination system for a scanner having a linear detector and a gate at which a media to be scanned can be positioned, to provide a scanning line of illumination at the gate, comprising:
  (a) a light source;
  (b) an optical assembly positioned to receive light from the light source and direct and shape the light to form a first line of illumination which is anamorphically divergent, the optical assembly including at least one integrator assembly which provides improved spatial uniformity of the light without diffusing the light;
  (c) a diffuser in the path of light from the optical assembly to increase optical divergence of the first line of illumination to form the scanning line of illumination.

5. An illumination system according to claim 4 wherein the integrator assembly comprises a light tunnel.

6. An illumination system for a scanner having a linear detector and a gate at which a media to be scanned can be positioned, to provide a scanning line of illumination at the gate, comprising:
  (a) a light source;
  (b) an optical assembly positioned to receive light from the light source and direct and shape the light to form a first line of illumination which is anamorphically divergent, the optical assembly including at least one fly's eye integrator assembly;
  (c) a diffuser in the path of light from the optical assembly to increase optical divergence of the first line of illumination to form the scanning line of illumination.

7. An illumination system according to claim 6 wherein the diffuser is an anamorphic diffuser.

8. An illumination system according to claim 6 wherein the diffuser provides a scanning line of illumination having a divergence of at least 25 degrees in both directions of the gate.

9. An illumination system according to claim 6 wherein the fly's eye integrator assembly is anamorphic to provide improved radiance uniformity only along the direction of the first line.

10. An illumination system according to claim 6 wherein the fly's eye integrator assembly provides improved radiance uniformity in both the direction along the first line and orthogonal thereto.

11. An illumination system according to claim 6 wherein the diffuser is spaced apart from the gate so that the diffuser is not imaged onto the linear detector and uniformity of the scanning line of illumination at the gate is further improved.

12. An illumination system according to claim 8 wherein the maximum divergence in both directions at the gate is 55 degrees.

13. An illumination system according to claim 6 wherein the optical assembly includes at least two fly's eye integrator assemblies.

14. An illumination system according to claim 13 additionally comprising an opaque blade variable aperture positioned intermediate the two fly's eye integrator assemblies.

15. An illumination system according to claim 14 wherein the variable aperture is positioned mid-way between the two fly's eye integrator assemblies.

16. An illumination system according to claim 6 wherein the light source is a lamp with a concave reflector.

17. An illumination system according to claim 6 wherein the light source includes a lamp selected from a xenon arc lamp, a tungsten halogen lamp, or a metal halide arc lamp.

18. An illumination system according to claim 6 wherein the diffuser comprises a holographic diffuser.

19. An illumination system according to claim 6 wherein the optical assembly includes at least one fly's eye integrator assembly and a light tunnel integrator.

20. An illumination system according to claim 6 wherein the optical assembly comprises a cylindrical lens system between the fly's eye integrator assembly and the diffuser.

21. An illumination apparatus according to claim 6 additionally comprising a spectral filter in the path of light from the light source, to prevent unwanted wavelengths of radiation from the light source reaching the gate.

22. A scanner, comprising:
  (a) a gate at which a media to be scanned can be positioned;
  (b) a light source;
  (c) an optical assembly positioned to receive light from the light source and direct and shape the light to form a first region of illumination, the optical assembly including at least one integrator assembly which provides improved spatial uniformity of the light without diffusing the light;
  (d) a diffuser in the path of light from the optical assembly to increase optical divergence of the first region of illumination to form a transfer region of illumination at the gate; and
  (e) a detector positioned to receive light from a media positioned in the gate for scanning, and to generate a sequence of signals corresponding to an illuminated region of the image.

23. A scanner, comprising:
  (a) a gate at which a media to be scanned can be positioned;
  (b) a light source;
  (c) an optical assembly positioned to receive light from the light source and direct and shape the light to form a first region of illumination, the optical assembly including at least one fly's eye integrator assembly;
  (d) a diffuser in the path of light from the optical assembly to increase optical divergence of the first region of illumination to form a transfer region of illumination at the gate; and (e) a detector positioned to receive light from a media positioned in the gate for scanning, and to generate a sequence of signals corresponding to an illuminated region of the image.

24. A printer comprising:

(a) a gate at which a media to be printed can be positioned;

(b) a light source;

(c) an optical assembly positioned to receive light from the light source and direct and shape the light to form a first region of illumination, the optical assembly including at least one integrator assembly which provides improved spatial uniformity of the light without diffusing the light;

(d) a diffuser in the path of light from the optical assembly to increase optical divergence of the first region of illumination to form a transfer region of illumination at the gate; and (e) a light sensitive print media positioned to receive light from an original media positioned in the gate for printing, to generate a print of an image on the light sensitive media.

25. A method of scanning a media, comprising:

(a) positioning a media carrying an image to be scanned at a gate;

(b) directing light from a light source through an optical assembly which directs and shapes the light to form a first region of illumination, the optical assembly including at least one integrator assembly which provides improved spatial uniformity of the light without diffusing the light;

(c) directing light from the optical assembly through a diffuser to increase optical divergence of the first region of illumination to form a scanning region of illumination on the media; and (d) directing light from the media onto a detector to generate a sequence of signals corresponding to the illuminated region of the image on the media.

\* \* \* \* \*